United States Patent
Kurihara et al.

(10) Patent No.: US 7,612,965 B2
(45) Date of Patent: Nov. 3, 2009

(54) THIN-FILM MAGNETIC HEAD HAVING HEATSINK WIDER ON AIR BEARING SURFACE SIDE

(75) Inventors: Katsuki Kurihara, Tokyo (JP); Taro Oike, Tokyo (JP); Hiraku Hirabayashi, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 794 days.

(21) Appl. No.: 11/214,725

(22) Filed: Aug. 31, 2005

(65) Prior Publication Data

US 2006/0077591 A1 Apr. 13, 2006

(30) Foreign Application Priority Data

Oct. 7, 2004 (JP) ............................. 2004-294760

(51) Int. Cl.
*G11B 5/31* (2006.01)
*G11B 5/39* (2006.01)

(52) U.S. Cl. ............................. 360/125.75; 360/125.74; 360/128

(58) Field of Classification Search ............ 360/125.31, 360/125.32, 125.74, 125.75, 128

See application file for complete search history.

(56) References Cited

U.S. PATENT DOCUMENTS

| 5,991,113 | A | 11/1999 | Meyer et al. |
| 2003/0099054 | A1 | 5/2003 | Kamijima |
| 2003/0174430 | A1 | 9/2003 | Takahashi et al. |
| 2004/0017638 | A1 | 1/2004 | Sato |
| 2006/0007594 | A1* | 1/2006 | Umehara et al. ............ 360/128 |

* cited by examiner

*Primary Examiner*—Craig A Renner
(74) *Attorney, Agent, or Firm*—Oblon, Spivak, McClelland, Maier & Neustadt, L.L.P.

(57) ABSTRACT

A thin-film magnetic head with a higher protrusion efficiency is provided, which comprises: a substrate with an air bearing surface (ABS); a read head element including a lower and upper shield layers, and a write head element including a magnetic pole layer; a heating element provided in a position opposite to the ABS in relation to the read and write head elements; and a heatsink element including a heatsink layer provided adjacent to an end opposite to an end in the ABS side of at least one layer of the lower and upper shield layers and the magnetic pole layer, the heatsink element having a shape that a pattern width in the track-width direction of an end portion in the ABS side is larger than a pattern width in the track-width direction of an end portion opposite to the end portion in the ABS side.

27 Claims, 14 Drawing Sheets

-- Prior Art --

US 7,612,965 B2

THIN-FILM MAGNETIC HEAD HAVING HEATSINK WIDER ON AIR BEARING SURFACE SIDE

PRIORITY CLAIM

This application claims priority from Japanese patent application No. 2004-294760, filed on Oct. 7, 2004, which is incorporated herein by reference.

BACKGROUND OF THE INVENTION

1. Field of the Invention

The present invention relates to a thin-film magnetic head with a heater, a head gimbal assembly (HGA) with the thin-film magnetic head and a magnetic disk drive apparatus with the HGA.

2. Description of the Related Art

In a magnetic disk drive apparatus, when writing or reading signals, a thin-film magnetic head hydrodynamically flies with a predetermined spacing on a rotating magnetic disk. While flying on the magnetic disk, the thin-film magnetic head writes signals to the magnetic disk using magnetic fields generated from an inductive write head element, and reads signals by sensing magnetic fields corresponding to the signals from the magnetic disk through an magnetoresistive (MR) effect read head element. On these occasions, a magnetic spacing $d_{MS}$ is defined as the effective magnetic distance between ends of these magnetic head elements and the surface of the magnetic disk.

With the higher recording density due to the increasing data storage capacity and the miniaturization of the magnetic disk drive apparatus in recent years, a track width of the thin-film magnetic head is becoming smaller. The smaller track width causes the writing and reading performance of the magnetic head to be reduced. In order to avoid this problem, latest magnetic disk drive apparatuses have a tendency to reduce the magnetic spacing $d_{MS}$. The value of the magnetic spacing $d_{MS}$ is actually designed to be reduced down to the order of 10 nm.

However, during writing signals, a Joule heat and a heat caused by eddy-current loss are generated from the inductive write head element. These heats raise a thermal pole tip protrusion (TPTP) phenomenon. In the case of the phenomenon, when the designed value of the magnetic spacing $d_{MS}$ is very small, the protruding MR read head element is at risk of contacting the magnetic disk surface, and a frictional heat generated by the contact may cause the electrical resistance value of the MR read head element to change, raising the problem such as an abnormal signal (thermal asperity).

To avoid this thermal asperity, some methods of providing a heater in the vicinity of the magnetic head elements to positively generate a TPTP phenomenon and controlling the magnetic spacing $d_{MS}$ are proposed (e.g., U.S. Pat. No. 5,991,113, and US Patent Publications Nos. 2003/0174430 A1 and 2003/0099054 A1).

The heater needs to be provided in a position opposite to an air bearing surface (ABS) in relation to the magnetic head elements in order to protrude the magnetic head elements toward the magnetic disk surface by the heat generated from the heater. When the heater is provided in this position, a layer for controlling heat conduction between the heater and the slider substrate can be provided in order to prevent heat dissipation from the heater to the slider substrate. However, in the case with the heat control layer, the heater is at risk of melting due to the increase in the temperature of itself. To avoid the risk, a heatsink layer can be provided in a position opposite to the slider substrate in relation to the heater. A technique in which the heatsink layer suppresses the thermal expansion of the inductive write head element by receiving heat generated from the element is described, for example, in US Patent Publication No. 2004/0017638 A1.

However, when the heatsink layer is provided adjacent to the heater, the problem of the decease in the protrusion efficiency of the magnetic head elements by the heat generated from the heater is often happened.

That is to say, most of the heat that arrives in the heatsink layer from the heater is then dissipated from the heatsink layer surface opposite to the heater, toward the surrounding overcoat layer. Therefore, the heatsink layer causes the heat flow that reaches the neighborhood of the magnetic head elements from the heater to be decreased. Consequently, the heat generated form the heater does not sufficiently reach the neighborhood of the magnetic head elements, so the thermal expansion that protrudes the magnetic head elements is not satisfactorily generated and the protrusion efficiency is decreased.

Due to the decreased protrusion efficiency, more electric power is needed in order to control the magnetic spacing $d_{MS}$. Therefore, it is difficult to lower the power consumption of the magnetic disk drive apparatus and to miniaturize the apparatus, which is recently tried to be incorporated into a mobile device such as a cellular phone.

BRIEF SUMMARY OF THE INVENTION

Therefore, it is an object of the present invention to provide a thin-film magnetic head with a higher protrusion efficiency of the magnetic head elements by the heat generated from the heater, an HGA provided with this thin-film magnetic head and a magnetic disk drive apparatus provided with this HGA.

Here, some terms will be defined before explaining the present invention. In a layered structure of the magnetic head elements formed on an element-formed surface of a slider substrate, a component that is closer to the slider substrate than a standard layer is defined to be "below" or "lower" in relation to the standard layer, and a component that is in the stacked direction side of the standard layer is defined to be "above" or "upper" in relation to the standard layer.

According to the present invention, a thin-film magnetic head is provided, which comprises: a substrate with an ABS; at least one read head element including a lower shield layer and an upper shield layer, and at least one write head element including at least one magnetic pole layer, formed on the substrate; at least one heating element provided in a position opposite to the ABS in relation to the at least one read head element and the at least one write head element; and at least one heatsink element including at least one heatsink layer provided adjacent to an end opposite to an end in the ABS side of at least one layer of the lower shield layer, the upper shield layer and the at least one magnetic pole layer, the at least one heatsink element having a shape that a pattern width in the track-width direction of an end portion in the ABS side is larger than a pattern width in the track-width direction of an end portion opposite to the end portion in the ABS side.

The pattern width ($W_{SH1}$) in the track-width direction of an end portion in the ABS side is larger than a pattern width ($W_{SH2}$) in the track-width direction of the opposite end portion. As the result, the heat reaching the heatsink element from the heating element positioned opposite to the ABS in relation to the magnetic head elements flows selectively to the direction that is mostly toward the upper and lower shield layers and the magnetic pole layer, and the amount of heat dissipated from the surface opposite to the heating element of the heatsink element is reduced. The more heat thereby reaches and expands the neighborhood of the magnetic head elements. Consequently, the conventional problem that most of the heat generated from the heating element is dissipated toward the area other than the neighborhood of the magnetic head elements can be solved, and the protrusion efficiency of these head elements by the heat generated from the heating element is improved.

Furthermore, by setting the pattern width $W_{SH1}$ to an enough large value, the heat generated from the write head element is dissipated enough toward the overcoat layer. As the result, a large inductance variation by the thermal expansion of the write head element itself can be avoided.

It is preferable that the at least one heatsink element has a shape that a pattern width in the track-width direction monotonically decreases from an end portion in the ABS side toward an end portion opposite to the end portion in the ABS side. More preferably, the at least one heatsink element have one shape or at-least-two-combined shape of a convex shape, a shape at least one of whose corners of rectangle is removed, a triangular shape and a semicircular shape, or the one shape or the at-least-two-combined shape whose corners are rounded.

By specifying the above-mentioned pattern width and shape of the heatsink element, the heat selectively flowing in the direction toward the upper and lower shield layers and the magnetic pole layer is increased. So the neighborhood of the magnetic head elements can be expanded more positively. Consequently, the protrusion efficiency by the heat of these head elements is more improved.

It is preferable that the at least one heating element is formed between the substrate and the at least one heatsink element. More preferably, the at least one heatsink element covers wholly the at least one heating element. It is also preferable that a heat-conduction-controlling layer is provided between the substrate and the at least one heating element, which is formed of a material with a coefficient of thermal conductivity smaller than that of materials that the substrate and the at least one heating element are formed of.

By positioning the heating element between the substrate and the heatsink, most of the heat transmitted in the direction opposite to the substrate is received by the heatsink element, and the amount of the heat reaching the neighborhood of the magnetic head element is increased. Consequently, the protrusion efficiency by the heat of these head elements is more improved. And in the case that the heating element is wholly covered with the heatsink element, the amount of the heat received by the heatsink element is more increased. Furthermore, by providing the heat-conduction-controlling layer, most of the heat transmitted to the substrate side from the heating element is prevented from reaching the substrate due to the shielding effect of the heat-conduction-controlling layer. Accordingly, the amount of the heat received by the heatsink element is more increased, and the protrusion efficiency by the heat of these head elements is much more improved.

It is preferable that the at least one heatsink layer is formed of the same deposited film as a film that at least one layer of the lower shield layer, the upper shield layer and the at least one magnetic pole layer, is formed of.

In this case, the distance between the heatsink layer and the element-formed surface of the slider substrate becomes the same as that between one layer of the upper and lower shield layers and the magnetic pole layer and the element-formed surface. As the result, the gap between the heatsink layer and the one layer is clearly defined. Moreover, because the constituent material of both layers becomes the same, it becomes easy to design the thermal conduction in the magnetic head elements.

Preferably, the at least one read head element is a giant MR (GMR) effect element or a tunnel MR (TMR) effect element.

A current-in-plane GMR (CIP-GMR) element, a current-perpendicular-to-plane GMR (CPP-GMR) element and the TMR element have very high sensitivity to magnetic fields, however their outputs depend strongly on their temperature. Correspondingly, by using these elements as the read head element of the thin-film magnetic head according to the present invention, the degradation of the reading performance due to the increase in the element temperature can be avoided, and these elements with very high sensitivity can be utilized effectively.

Also preferably, the at least one write head element is an inductive coil element for longitudinal magnetic recording or an inductive coil element for perpendicular magnetic recording.

According to the present invention, a HGA is provided, which comprises the above-mentioned thin-film magnetic head and trace conductors for supplying currents to the at least one heating element.

According to the present invention, a magnetic disk drive apparatus is further provided, which comprises at least one of the above-mentioned HGA and a heater-current control means for controlling currents supplied to the at least one heating element.

Further objects and advantages of the present invention will be apparent from the following description of preferred embodiments of the invention as illustrated in the accompanying drawings. Some elements have been designated with same reference numerals in the different drawings.

DETAILED DESCRIPTION OF THE INVENTION

Figure 1:
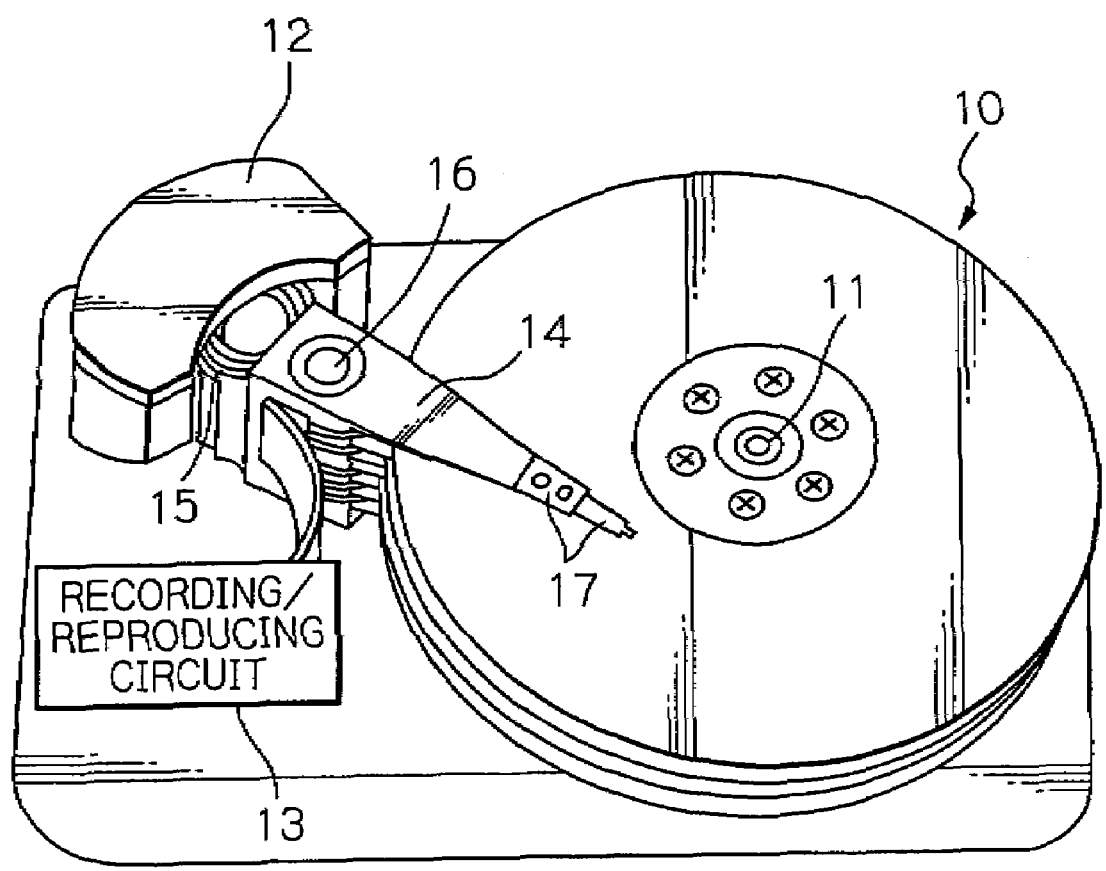
FIG. 1 shows a perspective view schematically illustrating a structure of a main part of an embodiment of a magnetic disk drive apparatus according to the present invention.
Figure 2:
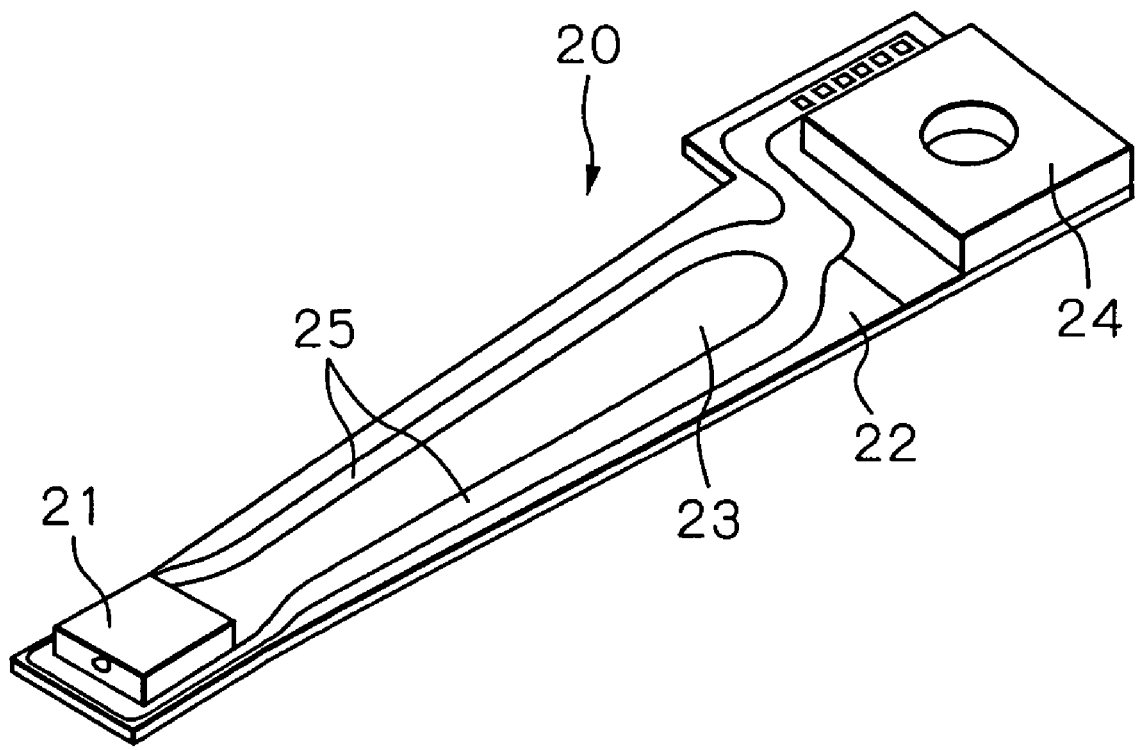
FIG. 2 shows a perspective view illustrating an embodiment of an HGA according to the present invention.
Figure 3:
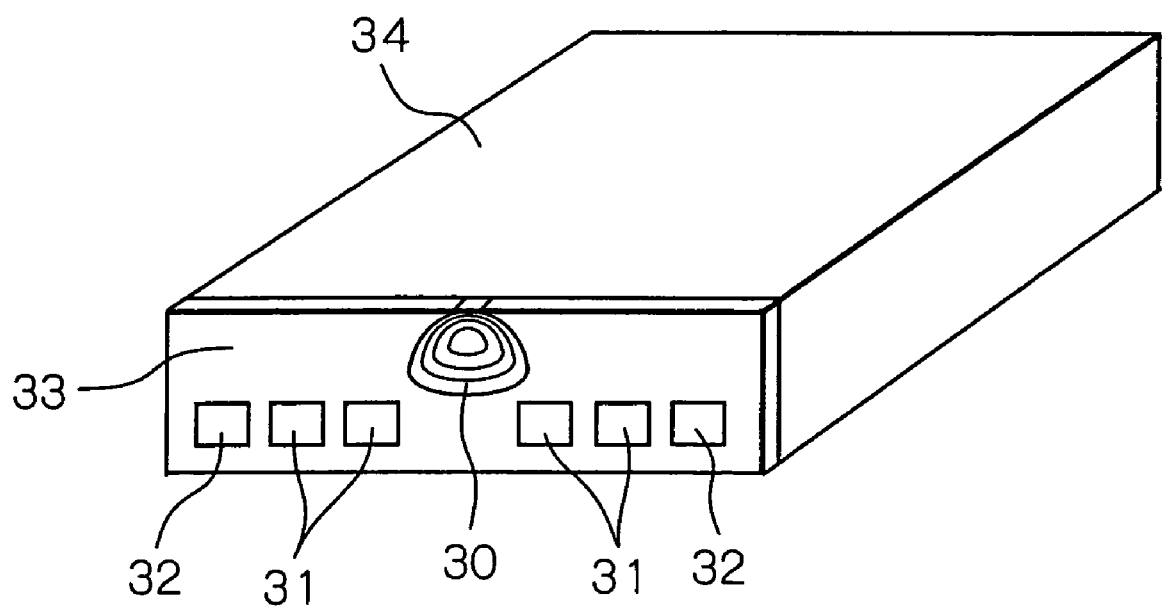
FIG. 3 shows a perspective view of an embodiment of a thin-film magnetic head provided on the end portion of the HGA.

FIG. 1 shows a perspective view schematically illustrating a structure of a main part of an embodiment of a magnetic disk drive apparatus according to the present invention, FIG. 2 shows a perspective view illustrating an embodiment of an HGA according to the present invention, and FIG. 3 shows a perspective view of an embodiment of a thin-film magnetic head (slider) provided on the end portion of the HGA.

In FIG. 1, reference numeral 10 indicates a plurality of magnetic disks rotating around a rotational axis of a spindle motor 11, 12 indicates an assembly carriage device for positioning a thin-film magnetic head (slider) on a track, and 13 indicates a recording/reproducing circuit for controlling read/write operations and heat operations of the thin-film magnetic head, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A slider is mounted on each HGA 17 in such a way as to face the surface of each magnetic disk 10. The each number of the magnetic disks 10, the drive arms 14, the HGAs 17 and the thin-film magnetic heads (sliders) can also be only one.

As shown in FIG. 2, the HGA is constructed by fixing a slider 21 having a magnetic head element on an end portion of a suspension 20 and electrically connecting one end of a wiring member 25 to signal electrodes of the slider 21.

The suspension 20 is mainly constructed of a load beam 22, a flexure 23 with elasticity fixed and supported on this load beam 22, a base plate 24 provided on the base portion of the load beam 22 and the wiring member 25 that is made up of trace conductors and connection pads electrically connected to both ends of the trace conductors, and is provided on the flexure 23.

It is obvious that the suspension structure of the HGA according to the present invention is not limited to the above-described structure. Though not shown in the figure, it is also possible to attach a head drive IC chip at some midpoint of the suspension 20.

As shown in FIG. 3, the slider according to the present embodiment is provided with an inductive write head element and an MR read head element 30, four signal electrodes 31 connected to these elements and two drive electrodes 32 for flowing currents through a heater which is not shown in FIG. 3, all of which are formed on an element-formed surface 33. Reference numeral 34 indicates an air bearing surface (ABS) of the slider. The number and positions of the signal electrodes are not limited to the mode in FIG. 3. In FIG. 3, there are six electrodes, but it is also possible to provide five electrodes and a ground connecting to the slider substrate.

Figure 4:
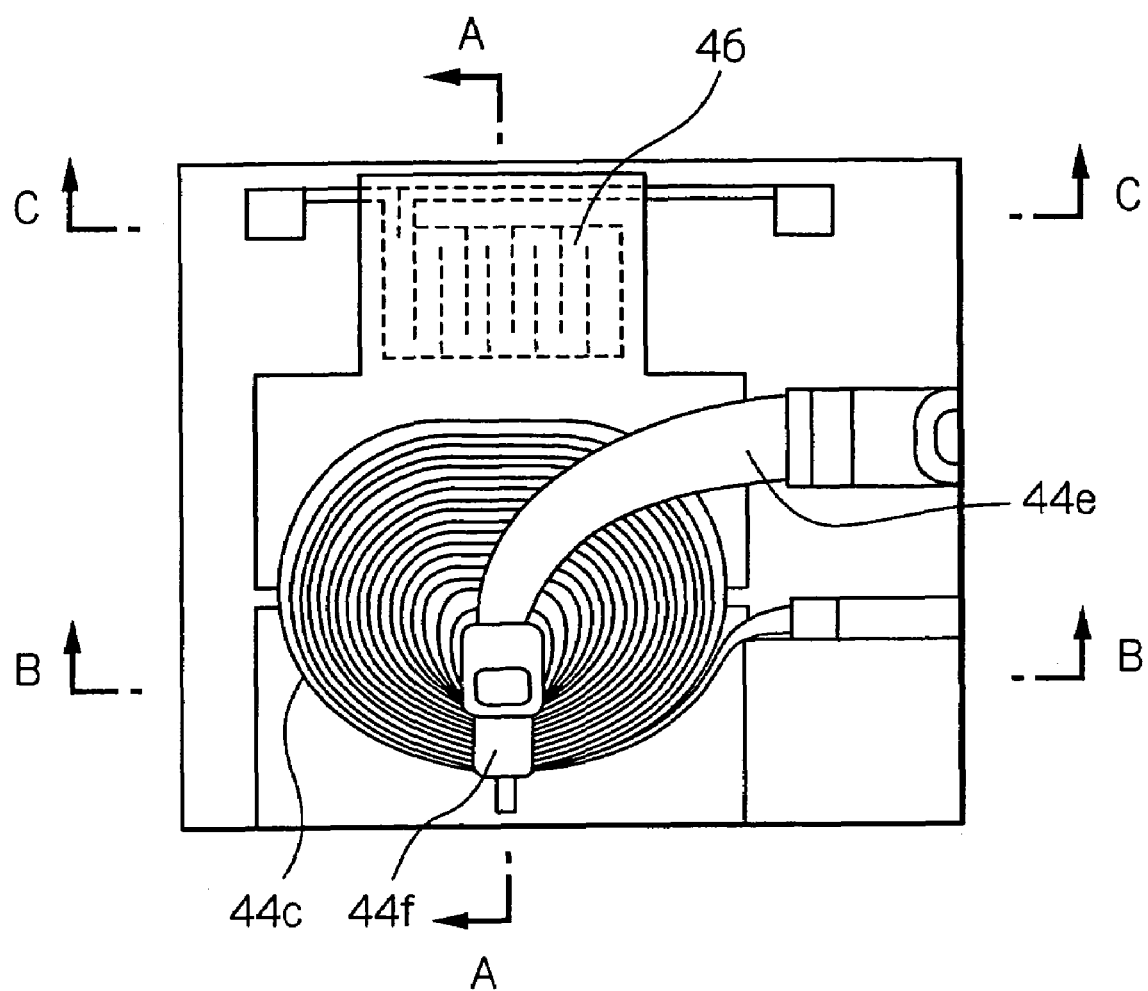
FIG. 4 shows a plain view illustrating an embodiment of the thin-film magnetic head according to the present invention viewed through from the side of the element-formed surface of the slider substrate.
Figure 5A:
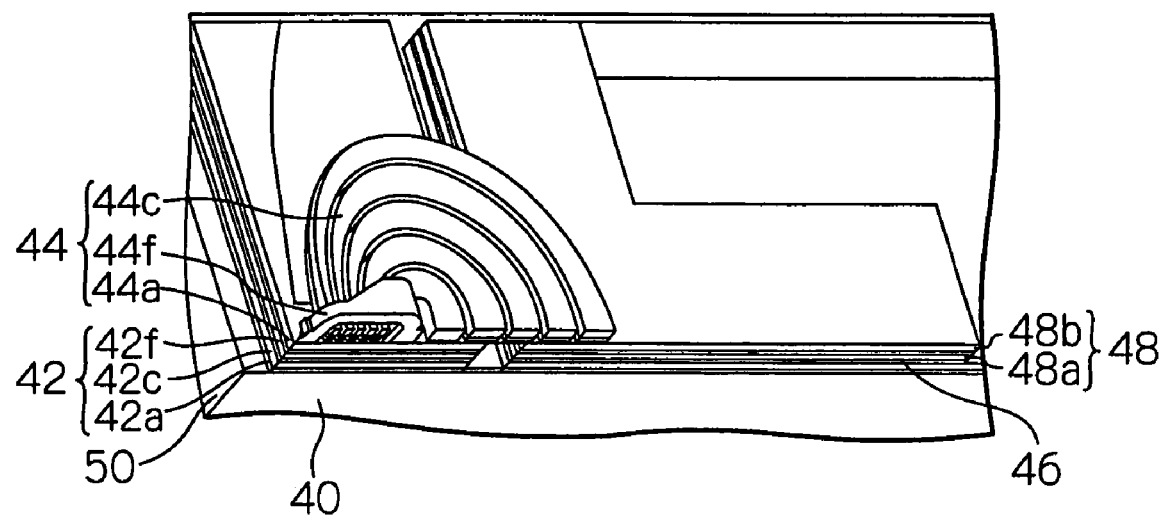
FIGS. 5a and 5b show a perspective view containing a cross-section surface taken along line A-A shown in FIG. 4, and the cross-sectional view taken along the line A-A, respectively.
Figure 5B:
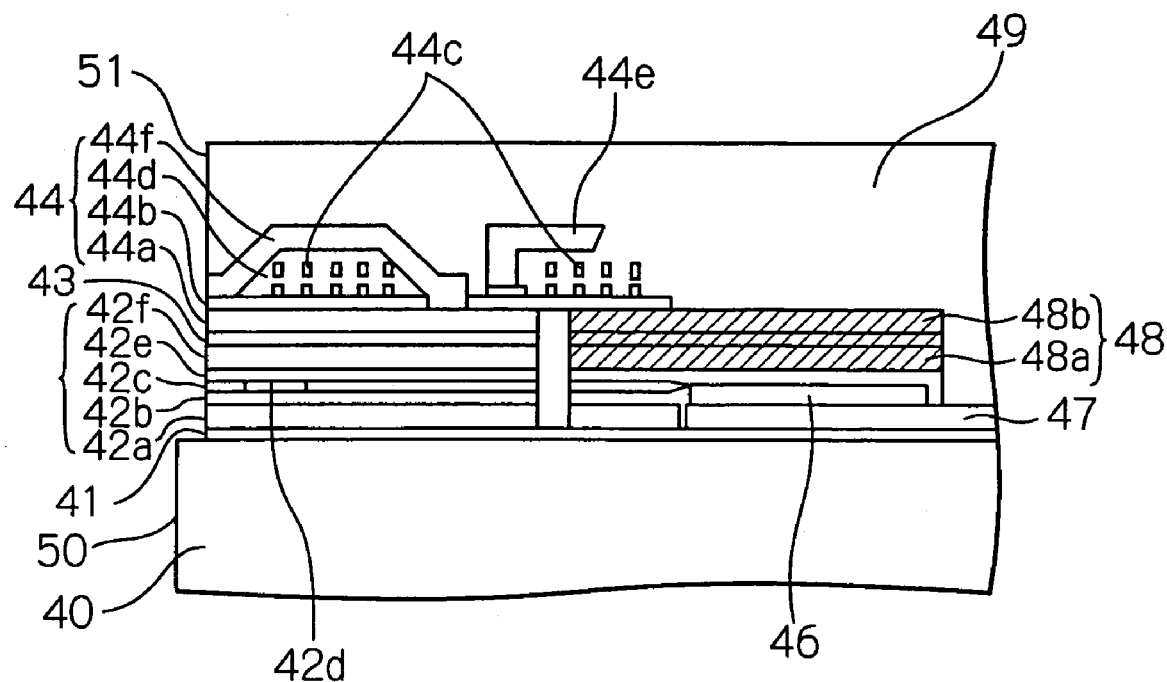

FIG. 4 shows a plain view illustrating an embodiment of the thin-film magnetic head according to the present invention viewed through from the side of the element-formed surface of the slider substrate, FIG. 5a shows a perspective view containing a cross-section surface taken along line A-A shown in FIG. 4, and FIG. 5b shows the cross-sectional view taken along the line A-A. The number of turns of the coil in FIGS. 5a and 5b is shown as if to be smaller than the number of turns in FIG. 4 for simplicity of drawings. The coil may be a two-layered coil or a helical coil. FIG. 4 and FIGS. 5a and 5b also schematically illustrate a structure of a heater 46 because this will be described in detail later.

In FIG. 5a, the slider substrate 40 has an ABS 50 and flies hydrodynamically over the surface of the rotating magnetic disk with a predetermined space during write and read operations. An MR read head element 42, an inductive write head element 44, a heater 46 and a heatsink 48 are formed on one side surface (element-formed surface) of the slider substrate 40 when the ABS 50 is set to a bottom.

The MR read head element 42 includes an MR layer 42c, a lower shield layer 42a and an upper shield layer 42f disposed in positions sandwiching the MR layer 42c. The MR layer 42c includes a CIP-GMR multilayer, a CPP-GMR multilayer or a TMR multilayer and senses magnetic fields corresponding to signals with very high sensitivity. When the MR layer 42c includes the CPP-GMR multilayer or the TMR multilayer, the lower shield layer 42a and the upper shield layer 42f act also as a lower electrode and an upper electrode, respectively. The lower shield layer 42a and upper shield layer 42f are magnetic layers and play the role of shielding external magnetic fields that causes noise to the MR layer 42c.

The inductive write head element 44 includes a lower magnetic pole layer 44a, an upper magnetic pole layer 44f and a coil layer 44c. The upper and lower magnetic pole layers 44f and 44a are magnetic paths to converge and guide magnetic flux induced by the coil layer 44c up to the magnetic disk surface onto which data is written. Instead of the upper shield layer 42f and the lower magnetic pole layer 44a, only one magnetic layer may be formed which serves as these layers.

The ends of the MR read head element 42 and the inductive write head element 44 facing the magnetic disk surface extend to a head end surface 51. The head end surface 51 is coated with diamond like carbon (DLC) and so on as a protective film. Here, the distance between the magnetic disk surface and the head end surface 51 around the ends of the read and write head elements during write/read operations corresponds to the magnetic spacing $d_{MS}$.

The heater 46 is formed in the position opposite to the head end surface 51 in relation to the MR read head element 42 and the inductive write head element 44, and between the slider substrate 40 and the heatsink 48. The position of the heater 46 is not limited to the above-described one. The heater is needed to be formed only in the position opposite to the head end surface 51 in relation to these head elements, and may be formed, for example, in the position above the heatsink 48.

The heatsink 48 includes a first heatsink layer 48a and a second heatsink layer 48b. The heatsink 48 enhances the heat flow from the heater 46 by receiving the heat of the heater. The enhancement prevents the heater 46 from melting by the heat generated from itself. Furthermore, the heatsink 48 has a specific shape (a convex shape in the figure), and the specific shape causes the heat flow to be directed positively toward the vicinity of the MR read head element 42 and the inductive write head element 44. Therefore, a protrusion efficiency of the magnetic head elements by the heat generated from the heater 46 is improved. The shape of the heatsink 48 for regulating the direction of the heat flow is afterward explained in detail. In the figure, the heatsink 48 has a multilayered structure including the two heatsink layers. The heatsink 48, however, may also have a multilayered structure including a single heatsink layer or more-than-two heatsink layers.

Next, the above-mentioned structure will be explained in more detail with FIG. 5b. The slider substrate 40 is made of, for example, AlTiC ($Al_2O_3$-TiC) and so on. Reference numeral 41 indicates an insulating layer with thickness of approximately 0.05 μm to 10 μm formed of, for example, $Al_2O_3$, etc., deposited on the slider substrate 40. The lower shield layer 42a is deposited on the insulating layer 41 and formed of, for example, NiFe, NiFeCo, CoFe, FeN or FeZrN, etc. with thickness of approximately 0.3 μm to 3 μm. Reference numeral 42b indicates a lower shield gap layer with thickness of approximately 0.005 μm to 0.5 μm formed of, for example, $Al_2O_3$ or DLC, etc., deposited on the lower shield layer 42a.

The MR layer 42c is made of, for example, the CIP-GMR multilayer, the CPP-GMR multilayer or the TMR multilayer. Reference numeral 42d indicates an element lead conductor layer connected to both ends of the MR layer 42c, formed of, for example, Cu, etc. and provided with a magnetic bias layer, and 42e indicates an upper shield gap layer with thickness of approximately 0.005 μm to 0.5 μm formed of, for example, $Al_2O_3$ or DLC, etc., deposited on the MR layer 42c and element lead conductor layer 42d. In the case where the MR layer 42c is made of the CPP-GMR multilayer or the TMR multilayer, the upper and lower shield gap layers 42e and 42b and the element lead conductor layer 42d become unnecessary. The upper shield layer 42f is deposited on the upper shield gap layer 42e and formed of, for example, NiFe, NiFeCo, CoFe, FeN or FeZrN, etc. with thickness of approximately 0.3 μm to 4 μm. A reproducing gap length that is the distance between the upper and lower shield layers 42f and 42a is approximately 0.03 μm to 1 μm.

Reference numeral 43 indicates an insulating layer with thickness of approximately 0.1 μm to 2.0 μm formed of, for example, $Al_2O_3$, etc., deposited on the upper shield layer 42f. The lower magnetic pole layer 44a is deposited on the insulating layer 43 and formed of, for example, NiFe, NiFeCo, CoFe, FeN or FeZrN, etc. with thickness of approximately 0.3 μM to 3 μm. When one magnetic layer is formed instead of the upper shield layer 42f and the lower magnetic pole layer 44a, which serves as these layers, the insulating layer 43 is omitted. Reference numeral 44b indicates a magnetic gap layer with thickness of approximately 0.03 μm to 0.5 μm (equivalent to the recording gap length), formed of, for example, $Al_2O_3$ or DLC, etc., deposited on the lower magnetic pole layer 44a. The coil layer 44c is deposited on the magnetic gap layer 44b and formed of, for example, Cu, etc. with thickness of approximately 0.5 μm to 3 μm. Reference numeral 44d indicates a coil insulating layer with thickness of approximately 0.1 μm to 5 μm, formed of, for example, a heat-cured resist, etc., covering the coil layer 44c, 44e indicates a coil lead conductor layer formed of, for example, Cu or NiFe, etc., electrically connected to one end of the coil layer 44c, respectively. The upper pole layer 44f is formed of, for example, NiFe, NiFeCo, CoFe, FeN or FeZrN, etc. with thickness of approximately 0.5 μm to 5 μm, acting as a magnetic pole and a magnetic yoke together with the lower magnetic pole layer 44a.

Reference numeral 47 indicates a heat-conduction-controlling layer with thickness of approximately 0.3 μm to 4 μm, formed of, for example, a heat-cured resist and so on. The first heatsink layer 48a is deposited on the heat-conduction-controlling layer 47 and formed of, for example, NiFe, NiFeCo, CoFe, FeN or FeZrN, etc. with thickness of approximately 0.3 μm to 4 μm, as well as the upper shield layer 42f. The second heatsink layer 48b is stacked on the insulating layer 43 deposited on the first heatsink layer 48a and formed of, for example, NiFe, NiFeCo, CoFe, FeN or FeZrN, etc. with thickness of approximately 0.3 μm to 3 μm as well as the lower magnetic pole layer 44a. Reference numeral 49 is an overcoat layer formed of, for example, $Al_2O_3$, and so on.

Figure 6:
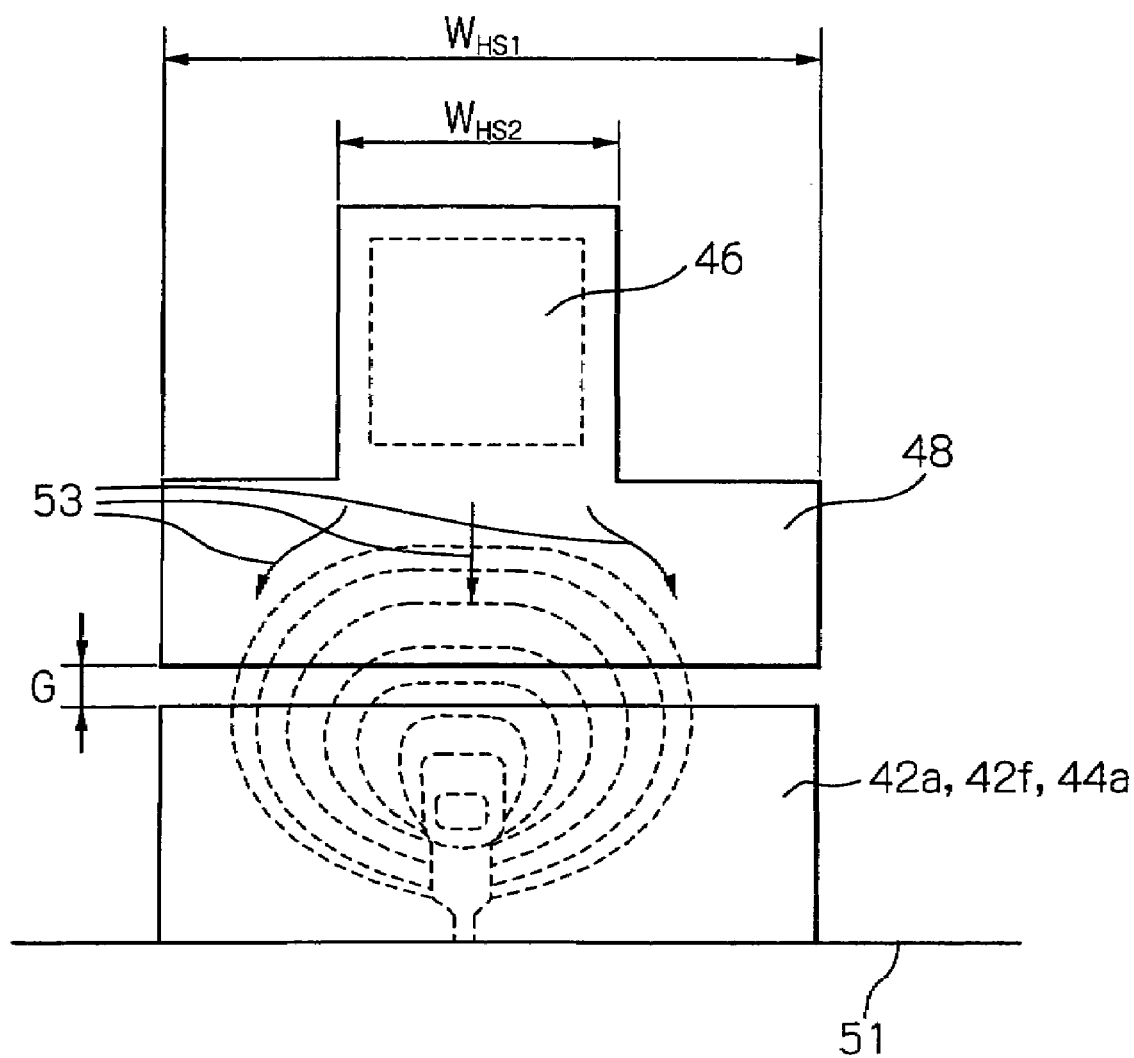
FIG. 6 shows a plain view illustrating the heatsink of the thin-film magnetic head according to the embodiment shown in FIG. 4 viewed through from the side of the element-formed surface of the slider substrate.

FIG. 6 shows a plain view illustrating the heatsink 48 of the thin-film magnetic head according to the embodiment shown in FIG. 4 viewed through from the side of the element-formed surface of the slider substrate, and FIGS. 7a to 7f show plain views illustrating alternatives of the heatsink 48 also viewed through from the side of the element-formed surface of the slider substrate.

According to FIG. 6, the heatsink 48 has a convex shape, and a pattern width $W_{SH1}$ in the track-width direction of an end portion in the side of the head end surface 51 is larger than a pattern width $W_{SH2}$ in the track-width direction of the opposite end portion. The heater 46 shown in broken line is positioned just below the convex part of the heatsink 48. The heatsink area around the portion that the heater 46 is covered with becomes small because $W_{SH1} > W_{SH2}$, though the heater 46 is wholly covered with the heatsink 48. Of the heat reaching the heatsink 48 from the heater 46, the amount of the heat dissipated from the surface opposite to the heater 46 of the heatsink 48 toward the overcoat layer 49 located above (not shown in the figure) is reduced due to the shape effect of the heatsink 48. Furthermore, as mentioned above, the heatsink 48 is formed chiefly of the metal with high thermal conductivity, and $W_{SH1} > W_{SH2}$, so the heat generated from the heater 46 flows selectively in the direction 53 that is mostly toward the lower magnetic pole layer 44a and the upper and lower shield layers 42f and 42a, and the heat expands the neighborhood of the MR read head element 42 and the inductive write head element 44. Consequently, the protrusion efficiency by the heat of these head elements is improved.

Meanwhile, because the pattern width $W_{SH1}$ of the heatsink 48 is set to an enough large value, the heat generated from the coil layer 44c of the inductive write head element is dissipated enough toward the overcoat layer. As the result, a large inductance variation due to the thermal expansion of the inductive write head element itself can be avoided.

A gap G between the heatsink 48 and the lower magnetic pole layer 44a, etc. is formed as the magnetic separation so that the upper and lower shield layers 42f and 42a could hold the shape and area favorable for maintaining their shielding effect. The gap G prevents the temperature-sensitive MR characteristic of the MR read head element from being degraded by the heat flowing from the heater 46, and prevents the large inductance variation of the inductive write head element due to the thermal expansion of the inductive write head element itself.

Figure 7A:
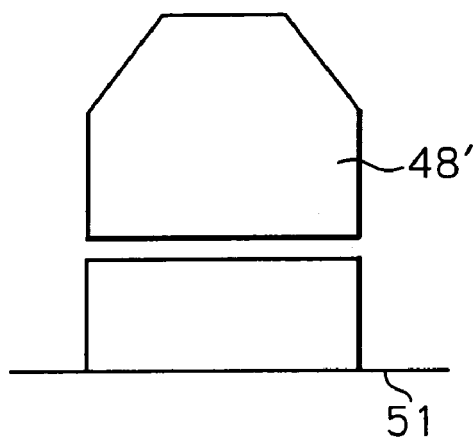
FIGS. 7a to 7f show plain views illustrating alternatives of the heatsink viewed through from the side of the element-formed surface of the slider substrate.
Figure 7B:
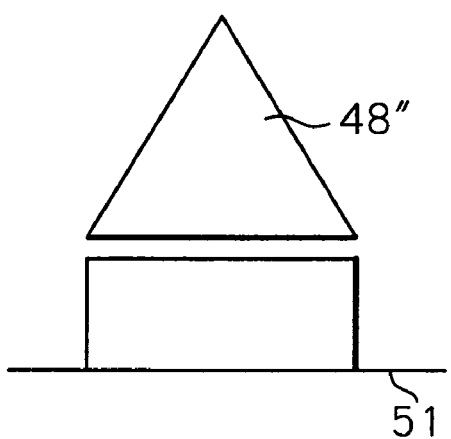
Figure 7C:
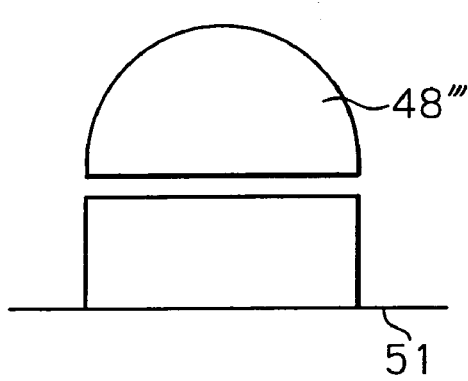
Figure 7D:
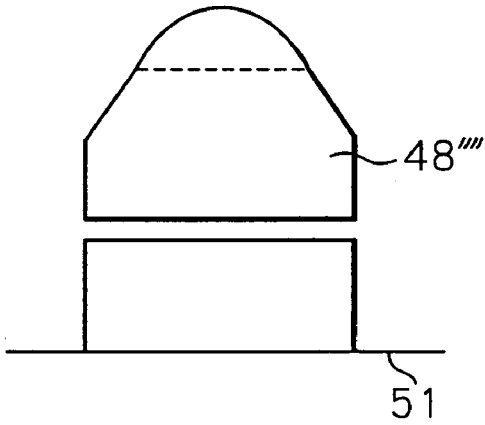
Figure 7E:
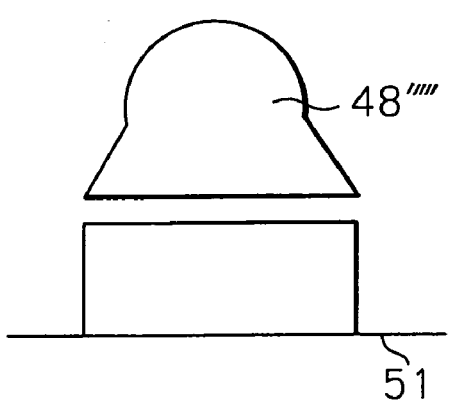
Figure 7F:
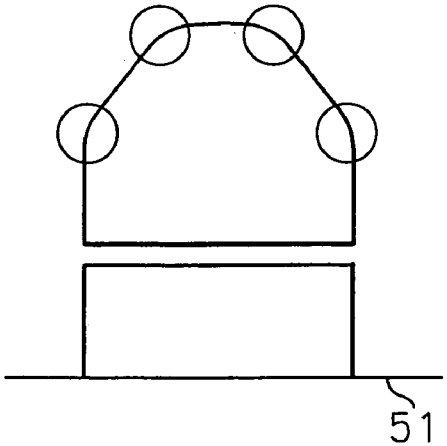

Next, various alternatives of the heatsink 48 will be explained. As is a heatsink 48' shown in FIG. 7a, the heatsink may have a shape whose two corners of rectangle opposite to the head end surface 51 are removed. A heatsink 48" shown in FIG. 7b has a triangular shape whose base is opposed to and is parallel with the head end surface 51. A heatsink 48''' shown in FIG. 7c has a semicircular shape whose linear base is opposed to and is parallel with the head end surface 51. A heatsink 48'''' shown in FIG. 7d has a combined shape of the semicircular shape and the shape shown in FIG. 7a. A heatsink 48'''' shown in FIG. 7e has a combined shape of the semicircular shape and the trapezoid shape. Furthermore, the heatsink may have the shape where some corners of the above-mentioned shapes are rounded or smoothed. In FIG. 7f, the shape where some corners of the heatsink 48' are rounded is shown.

In any shape shown in FIGS. 7a to 7f, the pattern width in the track-width direction is monotonically decreased from the end portion in the side of the head end surface 51 toward the opposite end portion, and the pattern width of the end portion in the side of the head end surface 51 becomes larger than that of the opposite end portion. Therefore, by using any heatsink that has one of these shapes as well as the heatsink having the shape shown in FIG. 6, the heat generated from the heater flows selectively in the direction that is toward the lower magnetic pole layer, etc. then the heat expands the neighborhood of the MR read head element 42 and the inductive write head element 44. Consequently, the protrusion efficiency by the heat of these head elements is improved.

Any shape shown in FIG. 6 and FIGS. 7a to 7f has a bilateral symmetry with respect to a predetermined plane perpendicular to the head end surface. However, the heatsink shape can also be asymmetric when it meets the above-mentioned condition of the pattern width. The heatsink can also have other shapes that meet the above-mentioned condition. Furthermore, in FIG. 6, the heater 46 is wholly covered with the heatsink 48. However, a part of the heatsink portion opposed to the heater 46 may also be lacked. As is obvious, it is preferable that the heater 46 is wholly covered with the heatsink 48 in order to avoid melting of the heater 46 and improve the protrusion efficiency of the magnetic head elements by the heat generated from the heater 46.

Figure 8:
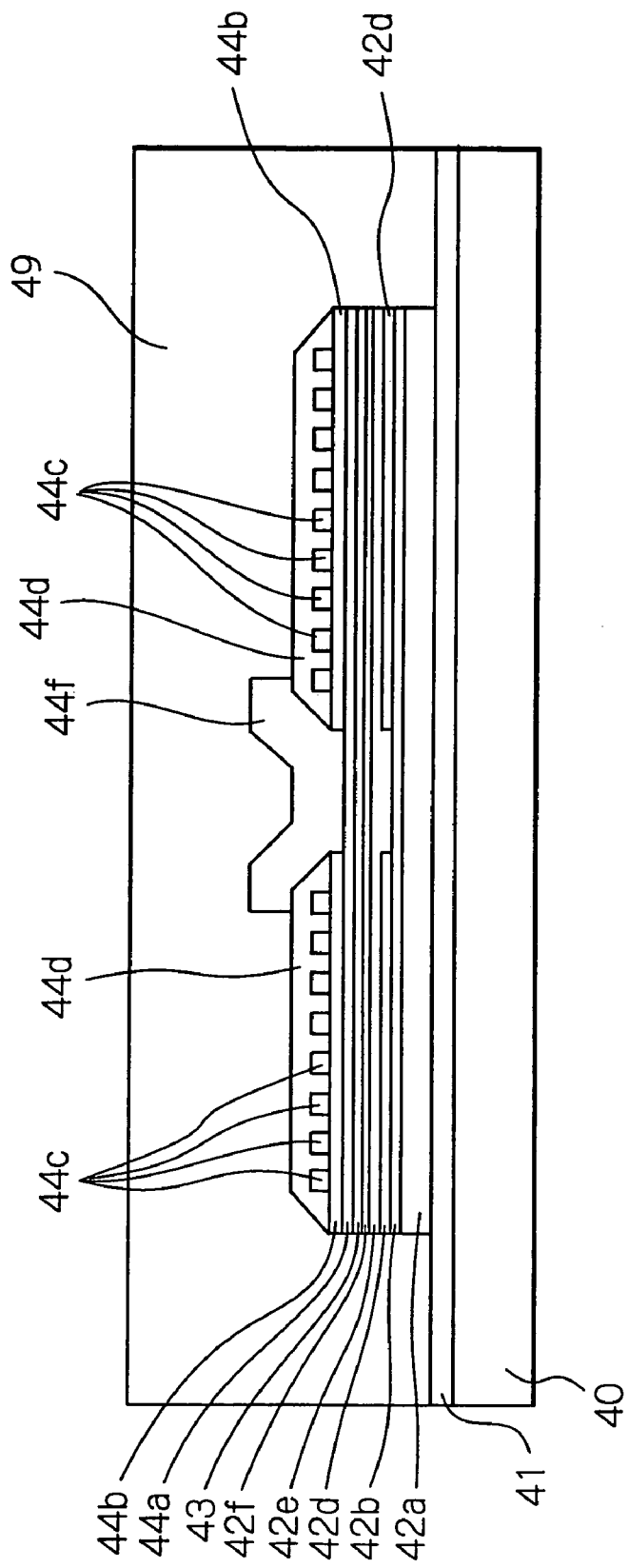
FIG. 8 shows a cross-sectional view taken along line B-B shown in FIG. 4 illustrating a structure of the thin-film magnetic head according to the embodiment shown in FIG. 4.

FIG. 8 shows a cross-sectional view taken along line B-B shown in FIG. 4 illustrating a structure of the thin-film magnetic head according to the embodiment shown in FIG. 4. The elements common to FIGS. 5a and 5b and FIG. 8 are designated with the same reference numerals. In the figure, the MR layer 42c, the coil lead conductor layer 44e, the heater 46, the heat-conduction-controlling layer 47 and the heatsink 48 are not appeared on the cross-section.

Figure 9:
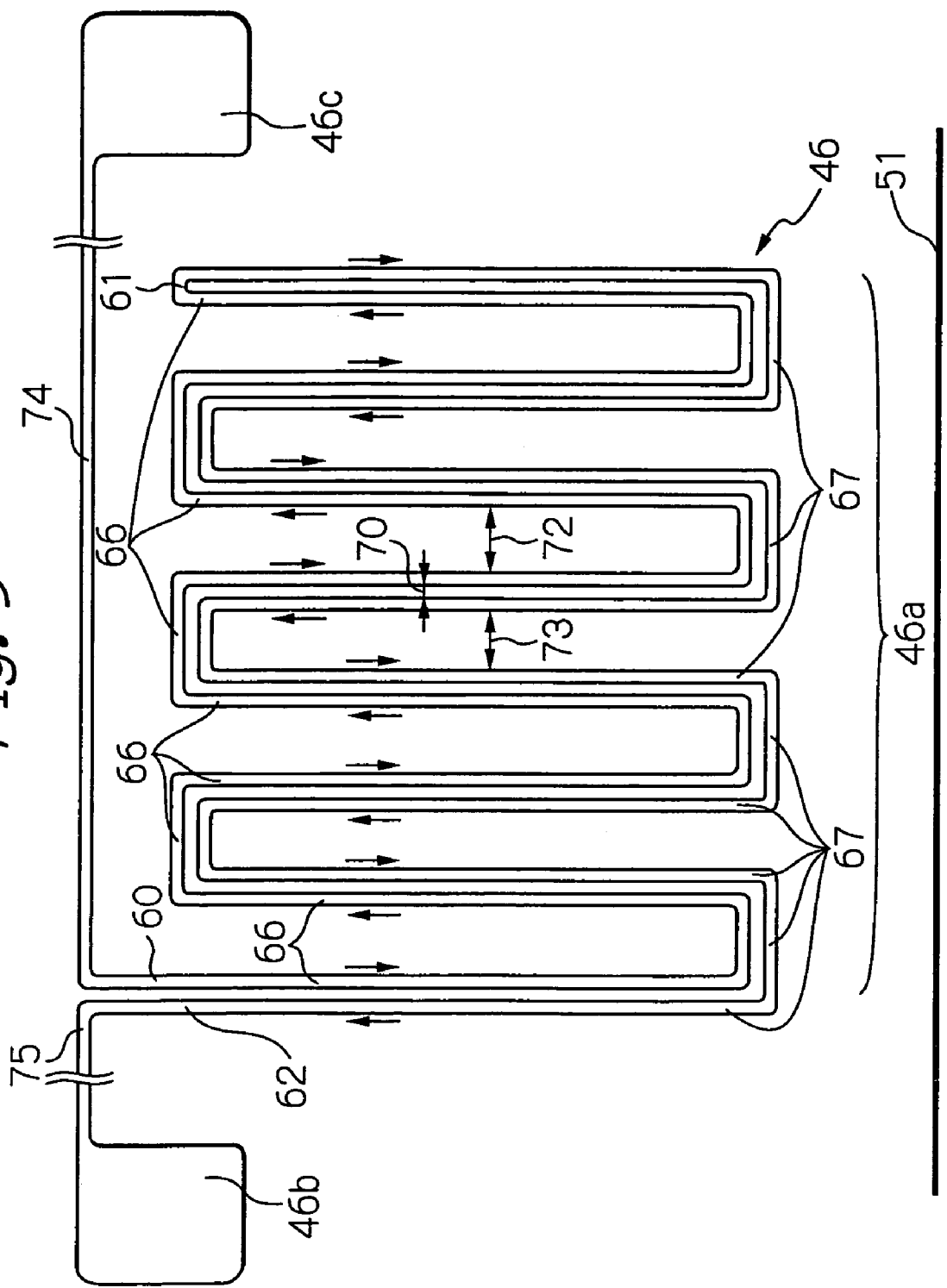
FIG. 9 shows a plain view illustrating a structure of the heater of the thin-film magnetic head according to the embodiment in FIG. 4, viewed through from the side of the element-formed surface of the slider substrate.
Figure 10:
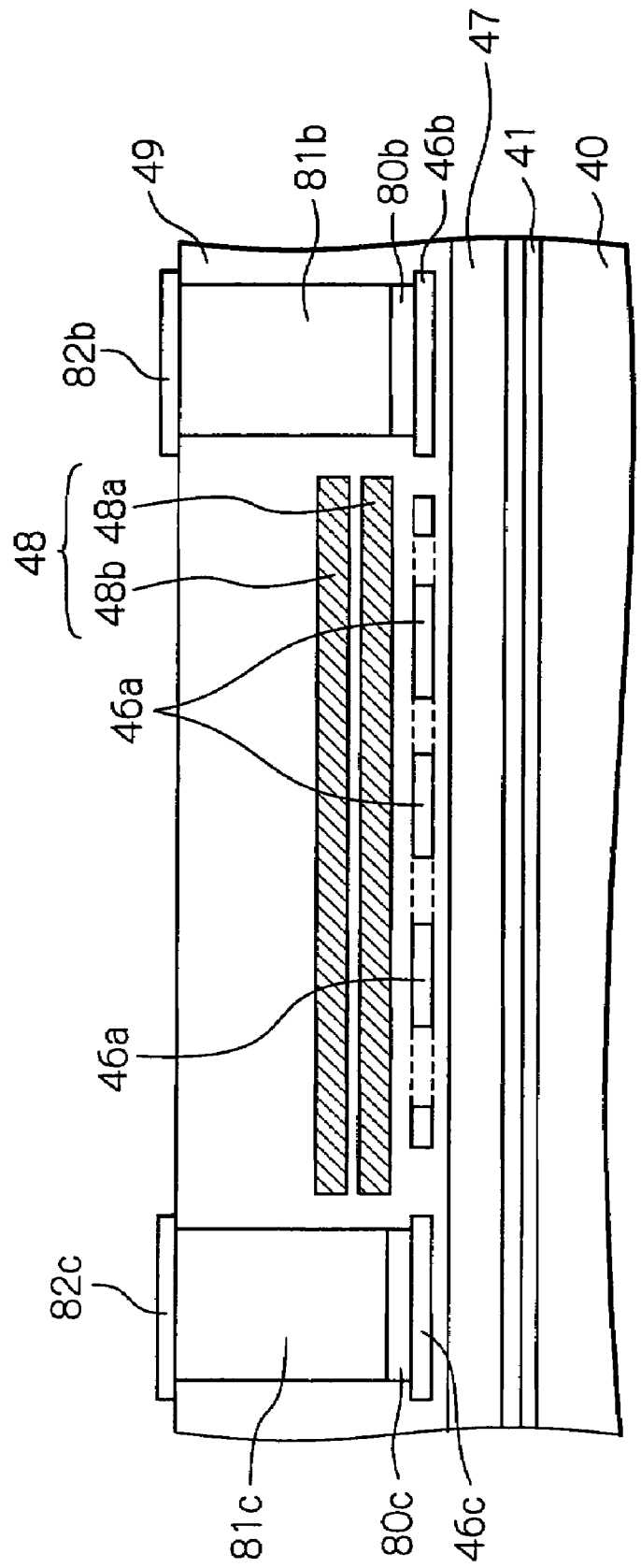
FIG. 10 shows a cross-sectional view taken along line C-C in FIG. 4 illustrating a structure of the electrode pads for the heater.

FIG. 9 shows a plain view illustrating a structure of the heater 46 of the thin-film magnetic head according to the embodiment in FIG. 4, viewed through from the side of the element-formed surface of the slider substrate. And FIG. 10 shows a cross-sectional view taken along line C-C in FIG. 4 illustrating a structure of the electrode pads for the heater 46.

According to FIG. 9, the heater 46 includes a heat-generating part 46a that consists of one line meandering in layer and lead electrodes 46b and 46c respectively connected to both ends of the heat-generating part 46a, constituting a current path of a predetermined length.

More specifically, the heat-generating part 46a consists of an up-line section 66 formed so as to meander in a square wave form from a predetermined starting point 60 to a turn-round 61, a down-line section 67 formed so as to return from the turn-round 61 to an end point 62 close to the starting point 60 meandering along the up-line section 66, a connection section 74 that connects the starting point 60 and the lead electrode 46c, and a connection section 75 that connects the end point 62 and the lead electrode 46b. The distance 70 between the up-line section 66 and the down-line section 67 formed so as to run along each other is set to be narrower than the distance 72 between the mutually facing parts of the up-line section 66 and the distance 73 between the mutually facing parts of the down-line section 67.

The heat-generating part 46a has a thickness of, for example, approximately 100 nm to 5000 nm and is made of, for example, a material containing NiCu. The content of Ni in NiCu is, for example, approximately 15 to 60 atomic % and preferably 25 to 45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

Furthermore, the heat-generating part 46a may also be made of a material containing NiCr. In this case, the content of Ni in NiCr is approximately 55 to 90 atomic % and preferably 70 to 85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heat generating part 46a may also be made of single Ta or a material containing Ta. Here, at least one of elements Al, Mn, Cu, Fe, Mo, Co, Rh, Si, Ir, Pt, Ti, Nb, Zr and Hf may also be included as an additive to this Ta. The content of the additive is preferably 5 atomic % or less.

The lead electrodes 46b and 46c may also be made of the same material as that of the heat generating part 46a.

According to FIG. 10, the heat-generating part 46a is formed between the heat-conduction-controlling layer 47 and the first heatsink layer 48a, and the lead electrodes 46b and 46c are extracted from the sandwiched area. The base electrode films 80b and 80c with conductivity are formed on the lead electrodes 46b and 46c respectively. Bumps 81b and 81c extending upward which are formed by electrolytic plating using the base electrode films 80b and 80c as electrodes are provided on the base electrode films 80b and 80c respectively. The base electrode films 80b and 80c, and bumps 81b and 81c are made of a conductive material such as Cu. The thickness of the base electrode films 80b and 80c is approximately 10 nm to 200 nm and the thickness of the bumps 81b and 81c is approximately 5 μm to 30 μm.

The top ends of the bumps 81b and 81c are exposed from the overcoat layer 49 and pads 82b and 82c for the heater 46 are provided at these top ends. A current is supplied to the heater 46 through the pads 82b and 82c. Likewise, the MR read head element 42 and the inductive write head element 44 are connected to the signal terminal electrodes 31 (FIG. 3). However, the connection structure of these elements is not shown for simplicity of drawings.

FIGS. 11a to 11d show cross-sectional views taken along line A-A in FIG. 4 explaining the manufacturing process of the thin-film magnetic head according to the embodiment shown in FIG. 4.

Hereinafter, the manufacturing process of the thin-film magnetic head according to the embodiment will be explained briefly with reference to the figures. First, as shown FIG. 11a, an insulating layer 41 is deposited on the substrate 40 using, for example, a sputtering technique. Next, a film to constitute the lower shield layer 42a is formed on the insulating layer 41 using, for example, a plating technique, and then, the lower shield layer 42a and the gap G are formed using, for example, a photolithographic method. Then, the heat-conduction-controlling layer 47 is formed in the position adjacent to the lower shield layer 42a, opposite to the head end surface 51. Then, the heat-generating part 46a and the lead electrodes 46b and 46c constituting the heater 46 are formed on the heat-conduction-controlling layer 47 using, for example, a sputtering technique.

Figure 11A:
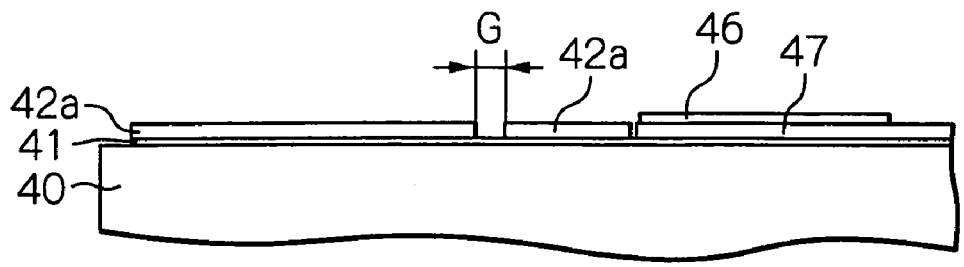
FIGS. 11a to 11d show cross-sectional views taken along line A-A in FIG. 4 explaining the manufacturing process of the thin-film magnetic head according to the embodiment shown in FIG. 4.
Figure 11B:
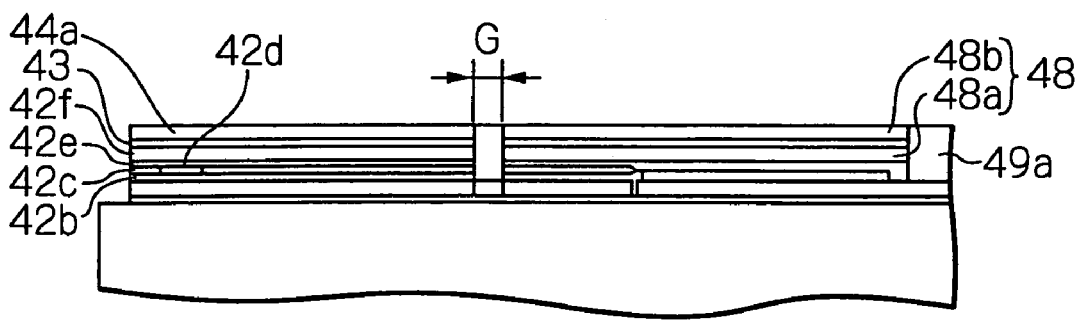
Figure 11C:
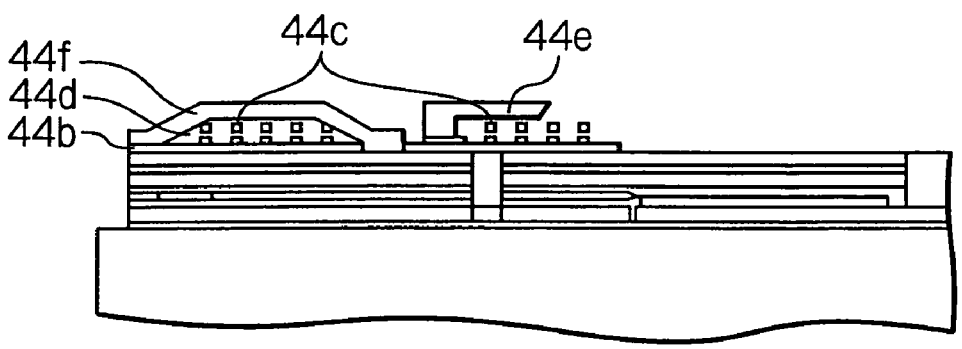

Next, as shown in FIG. 11b, a film to constitute the lower shield gap layer 42b is formed using, for example, a sputtering technique. Then, the MR layer 42c, the element lead conductor layer 42d, and a film to constitute the upper shield gap layer 42e are formed sequentially using, for example, a sputtering technique. Then, a film to constitute the upper shield layer 42f is formed using, for example, a plating technique. Then, a film to constitute the insulating layer 43 and a film to constitute the lower magnetic pole layer 44a are formed on the film to constitute the upper shield layer 42f using, for example, a sputtering technique.

Then, by using common techniques such as a photolithographic method and a dry-etching method, these films are patterned, and the gap G is formed. This patterning and the gap formation provide the multilayer of the upper shield layer 42f, the insulating layer 43 and the lower magnetic pole layer 44a, and the heatsink 48 including the first heatsink layer 48a and the second heatsink layer 48b which have predetermined forms respectively. Then, a planarizing layer 49a is formed, and the gap G is filled with the same material as the planarizing layer 49a. The formation of the MR read head element 42 is completed through the above-described process.

Figure 11D:
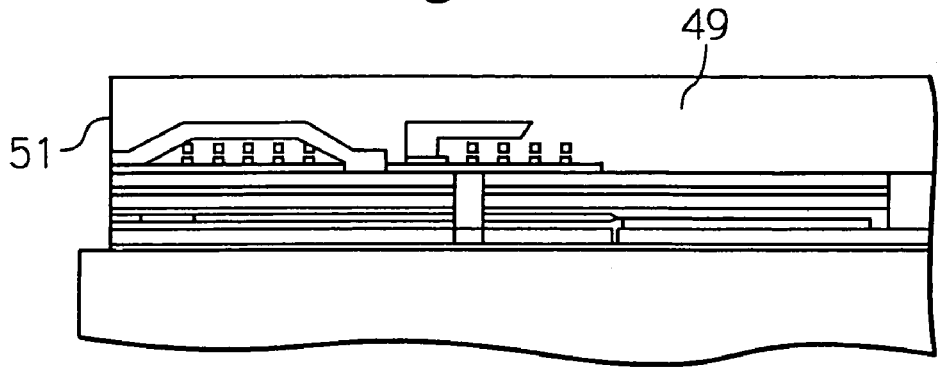

Next, as shown in FIG. 10c, by using common techniques such as a sputtering technique, a photolithographic method and a dry-etching method, the magnetic gap layer 44b and the coil layer 44c on the magnetic gap layer 44b is formed, and then, the coil insulating layer 44d and the upper magnetic pole layer 44f are formed so as to cover the coil layer 44c. The formation of the inductive write head element 44 is completed through the above-described process. After the formation, as shown in FIG. 11d, the overcoat layer 49 is formed so as to cover the head elements.

Figure 12:
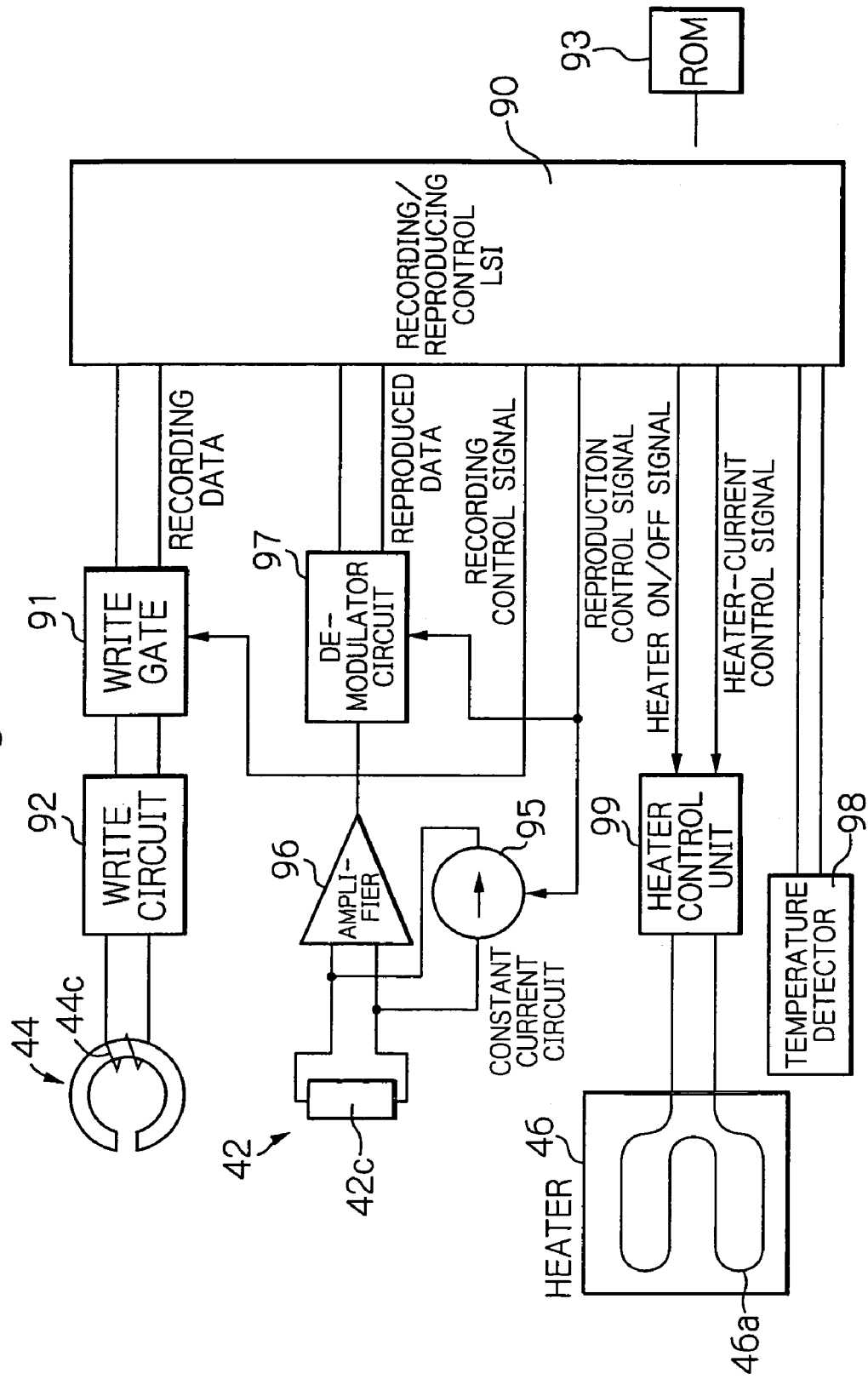
FIG. 12 shows a block diagram illustrating the circuit structure of the recording/reproducing circuit of the magnetic disk drive apparatus according to the embodiment in FIG. 1.

FIG. 12 shows a block diagram illustrating the circuit structure of the recording/reproducing circuit 13 of the magnetic disk drive apparatus according to the embodiment in FIG. 1.

In FIG. 12, reference numeral 90 indicates a recording/reproducing control LSI, 91 indicates a write gate that receives recording data from the recording/reproducing control LSI 90, 92 indicates a write circuit, 93 indicates a ROM that stores a table and so on for controlling current values to the heater, 95 indicates a constant current circuit that supplies a sense current to the MR read head element 42, 96 indicates an amplifier that amplifies the output voltage of the MR read head element 42, 97 indicates a demodulator circuit that outputs reproduced data to the recording/reproducing control LSI 90, 98 indicates a temperature detector, and 99 indicates a control unit of the heater 46, respectively.

The recording data that is output from the recording/reproducing control LSI 90 is supplied to the write gate 91. The write gate 91 supplies recording data to the write circuit 92 only when a recording control signal that is output from the recording/reproducing control LSI 90 instructs a write operation. The write circuit 92 passes a write current through the coil layer 44c corresponding to this recording data, and the inductive write head element 44 writes data on the magnetic disk 10 (FIG. 1).

A constant current flows from the constant current circuit 95 into the MR layer 42c only when the reproduction control signal that is output from the recording/reproducing control LSI 90 instructs a read operation. The signal reproduced by this MR read head element 42 is amplified by the amplifier 96, demodulated by the demodulator circuit 97, and then, the obtained reproduced data is output to the recording/reproducing control LSI 90.

The heater control unit 99 receives a heater ON/OFF signal and a heater-current control signal that are output from the recording/reproducing control LSI 90. When the heater ON/OFF signal is an ON operation instruction, a current flows into the heat-generating part 46a of the heater 46. The current value in this case is controlled to a value corresponding to the heater-current control signal.

Thus, it is possible to realize not only a current application to the heater linked with the recording/reproducing operation but also a more diversified current application mode by providing a heater ON/OFF signal and heater-current control signal system independently from the recording/reproducing operation control signal system.

In the actual operation, a current corresponding to a predetermined current application mode flows into the heat-generating part 46a of the heater 46. A heat is generated from the heater 46 by this current and reaches the inductive write head element 44 and the MR read head element 42 by propagating through the heatsink, and then, the heat expansion causes the head elements to protrude in the direction toward the head end surface 51. This allows the magnetic spacing $d_{MS}$ to be reduced only during a write and read operation. Thus, the reduction of the magnetic spacing $d_{MS}$ only during operation of the magnetic head elements makes it possible to compensate a reduction in the write and/or read performance caused by the decrease in the track width and deal with the weakening of signal fields caused by downsizing of recording bits, without considerably increasing the probability that the slider may crash into the magnetic disk surface. This $d_{MS}$ value can be adjusted precisely by the heater-current control signal that controls the current flowing through the heat-generating part 46a.

It is obvious that the circuit structure of the recording/reproducing circuit 13 is not limited to that shown in FIG. 12. It is also possible to specify the write and read operations using a signal other than a recording control signal and reproduction control signal. Furthermore, it is desirable to cause the heater 46 to generate the heat at least during both write and read operations, but it is also possible to cause the heater 46 to generate the heat during either write operation or read operation or continuously during a predetermined period in which a write operation and a read operation continue. Moreover, it is also possible to use not only DC but also AC or pulse current, etc., as the current flowing through the heater 46.

Hereinafter, the effect of the heatsink shape in the thin-film magnetic head according to the present invention will be explained using an embodiment.

Figure 13A:
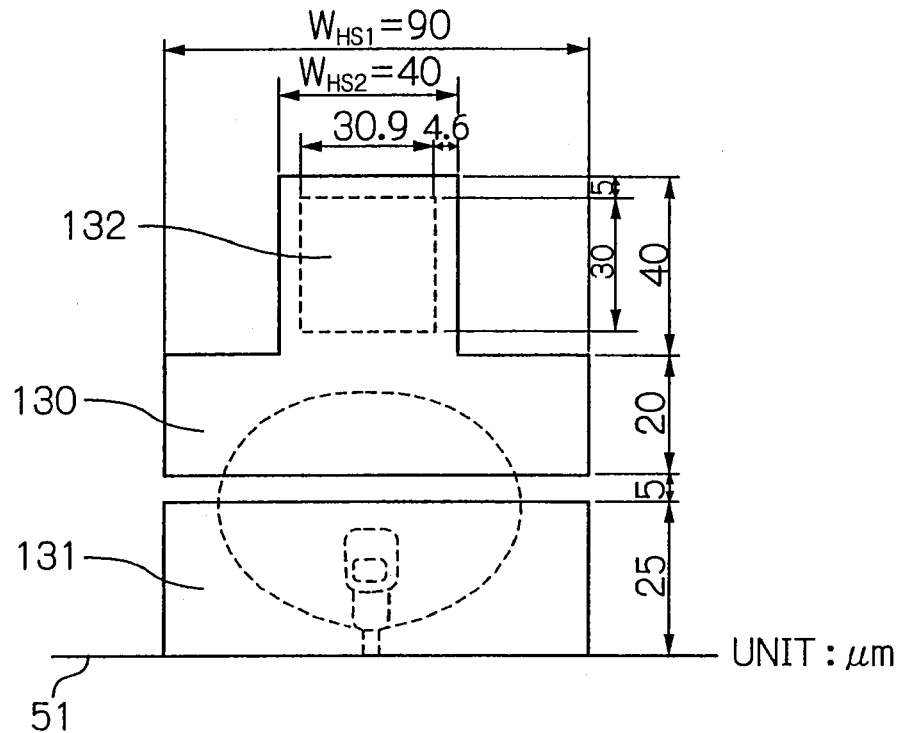
FIGS. 13a and 13b show plain views illustrating a heatsink of an embodiment of the thin-film magnetic head according to the present invention and a heatsink of the conventional thin-film magnetic head as a comparative embodiment, respectively, viewed through from the side of the element-formed surface of the slider substrate.
Figure 13B:
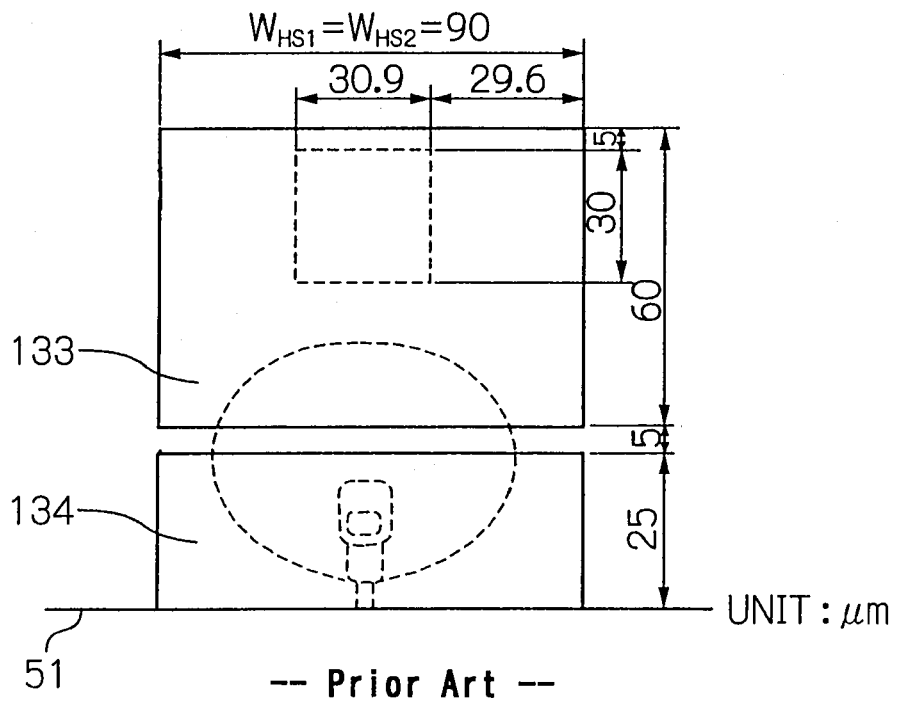

FIG. 13a shows a plain view illustrating a heatsink of an embodiment of the thin-film magnetic head according to the present invention viewed through from the side of the element-formed surface of the slider substrate, and the specific sizes are described in the figure. FIG. 13b shows a plain view illustrating a heatsink of the conventional thin-film magnetic head, as a comparative embodiment, viewed through from the side of the element-formed surface, and the specific sizes are also described in the figure. In these figures, the inductive write head element formed above the lower magnetic pole layer is illustrated simply by broken lines.

In FIG. 13a, the heatsink 130 has a convex shape as is also shown in FIG. 6. In the heatsink 130, $W_{HS1}$=90.0 µm, and $W_{HS2}$=40.0 µm. The heater 132 has a size of 30.0 µm×90.0 µm and is positioned directly below the convex portion of the heatsink 130. The heatsink 130 covers wholly the heater 132. The gap G between the heatsink 130 and the magnetic-head-element multilayer 131 including the upper and lower shield layers that are rectangles of 90.0 µm×25.0 µm, the MR layer and the lower magnetic pole layer, is 5.0 µm.

Meanwhile, in FIG. 13b, the conventional heatsink 133, as a comparative embodiment, is a rectangle of 90.0 µm×60.0 µm, and is positioned with the gap G of 5.0 µm between itself and the magnetic-head-element multilayer 134 that is a rectangle of 90.0 µm×25.0 µm. That is to say, the shape of the heatsink 130 in FIG. 13a is equivalent to the convex one that the two corners opposite to the head end surface of the conventional heatsink 133 are cut off. In FIGS. 13a and 13b, other structures than the heatsink shape are the same as each other, including the position of the heater.

Figure 14:
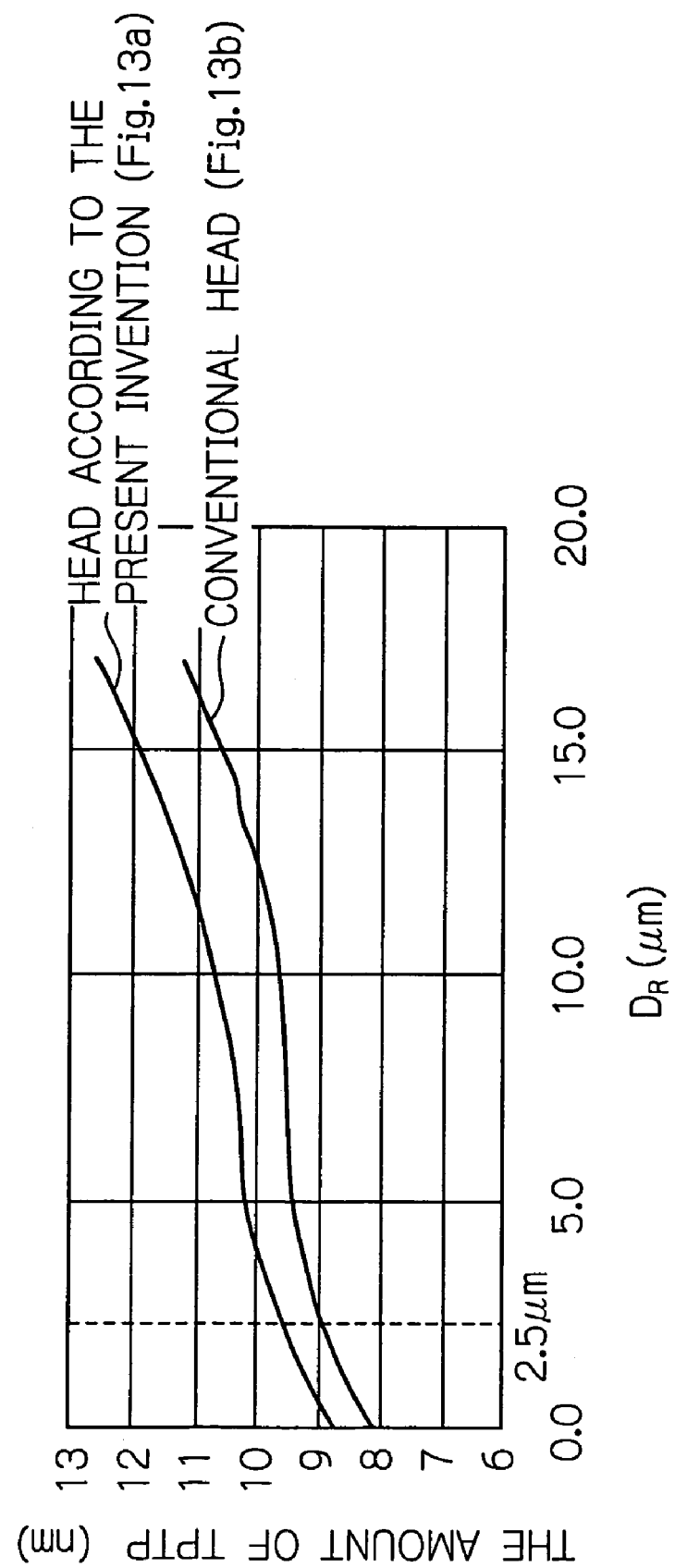
FIG. 14 shows a graph of the amount of TPTP on the head end surfaces of the thin-film magnetic heads with the heatsinks that have shapes shown in FIGS. 13a and 13b respectively.

FIG. 14 shows a graph of the amount of TPTP on the head end surfaces of the thin-film magnetic heads with the heatsinks that have shapes shown in FIGS. 13a and 13b respectively. The horizontal axis is a distance $D_R$ from the element-formed surface of the slider substrate to a measuring point on the head end surface, and the vertical axis is the amount of protrusion (TPTP) at the measuring point by the heat generated from the heater. Supplied powers to the respective heaters of both heads are 100 mW. The amount of TPTP is obtained by simulation.

As shown in FIG. 14, the shape of protrusion on the head end surface of the thin-film magnetic head according to the present invention (FIG. 13a) is almost the same as that in the conventional thin-film magnetic head (FIG. 13b). However, the amount of TPTP in the thin-film magnetic head according to the present invention becomes larger in all the range of the head end surface. At the point that $D_R$=2.5 μm corresponding to the end of the magnetic head element, while the amount of TPTP in the conventional thin-film magnetic head is 9.0 nm, the amount of TPTP in the thin-film magnetic head according to the present invention becomes larger value of 9.7 nm. That is to say, the amount of TPTP is improved by about 7.7% in the thin-film magnetic head according to the present invention.

With the result, it can be understood that, in the thin-film magnetic head according to the present invention, the protrusion efficiency of the magnetic head elements by the heat generated from the heater is greatly improved, in comparison to the conventional thin-film magnetic head.

Furthermore, it is obvious that the present invention has applicability not only to longitudinal magnetic recording but also perpendicular magnetic recording. Even if the inductive write head element has a structure corresponding to perpendicular magnetic recording, the effect of the heatsink shape due to which the heat current generated from the heater flows selectively, is the same as that in the above-mentioned case. Moreover, it is obvious that the effect of the heat generated from the inductive write head element with the structure corresponding to perpendicular magnetic recording is also similar.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
a substrate with an air bearing surface;
at least one read head element including a lower shield layer and an upper shield layer, and at least one write head element including at least one magnetic pole layer, formed on said substrate;
at least one heating element provided in a position opposite to said air bearing surface in relation to said at least one read head element and said at least one write head element; and
at least one heatsink element including at least one heatsink layer provided adjacent to an end opposite to an end in said air bearing surface side of at least one layer of said lower shield layer, said upper shield layer and said at least one magnetic pole layer,
said at least one heatsink element having a shape that a pattern width in a track-width direction of an end portion in said air bearing surface side is larger than a pattern width in the track-width direction of an end portion opposite to said end portion in said air bearing surface side.

2. The thin-film magnetic head as claimed in claim 1, wherein said at least one heatsink element has a shape that a pattern width in the track-width direction monotonically decreases from an end portion in said air bearing surface side toward an end portion opposite to said end portion in said air bearing surface side.

3. The thin-film magnetic head as claimed in claim 1, wherein said at least one heatsink element has one shape or at-least-two-combined shapes of a convex shape, a shape with at least one corner of a rectangle removed, a triangular shape and a semicircular shape, or said one shape or said at-least-two-combined shapes with corners rounded.

4. The thin-film magnetic head as claimed in claim 1, wherein said at least one heating element is formed between said substrate and said at least one heatsink element.

5. The thin-film magnetic head as claimed in claim 4, wherein said at least one heatsink element covers wholly said at least one heating element.

6. The thin-film magnetic head as claimed in claim 4, wherein a heat-conduction-controlling layer is provided between said substrate and said at least one heating element, which is formed of a material with a coefficient of thermal conductivity smaller than that of materials that said substrate and said at least one heating element are formed of.

7. The thin-film magnetic head as claimed in claim 1, wherein said at least one heatsink layer is formed of the same deposited film as a film that at least one layer of said lower shield layer, said upper shield layer and said at least one magnetic pole layer, is formed of.

8. The thin-film magnetic head as claimed in claim 1, wherein said at least one read head element is a giant magnetoresistive effect element or a tunnel magnetoresistive effect element.

9. The thin-film magnetic head as claimed in claim 1, wherein said at least one write head element is an inductive coil element for longitudinal magnetic recording or an inductive coil element for perpendicular magnetic recording.

10. A head gimbal assembly comprising:
a thin-film magnetic head comprising:
a substrate with an air bearing surface;
at least one read head element including a lower shield layer and an upper shield layer, and at least one write head element including at least one magnetic pole layer, formed on said substrate;
at least one heating element provided in a position opposite to said air bearing surface in relation to said at least one read head element and said at least one write head element; and
at least one heatsink element including at least one heatsink layer provided adjacent to an end opposite to an end in said air bearing surface side of at least one layer of said lower shield layer, said upper shield layer and said at least one magnetic pole layer,
said at least one heatsink element having a shape that a pattern width in a track-width direction of an end portion in said air bearing surface side is larger than a pattern width in the track-width direction of an end portion opposite to said end portion in said air bearing surface side; and trace conductors for supplying currents to said at least one heating element.

11. The head gimbal assembly as claimed in claim 10, wherein said at least one heatsink element has a shape that a pattern width in the track-width direction monotonically decreases from an end portion in said air bearing surface side toward an end portion opposite to said end portion in said air bearing surface side.

12. The head gimbal assembly as claimed in claim 10, wherein said at least one heatsink element has one shape or at-least-two-combined shapes of a convex shape, a shape with at least one corner of a rectangle removed, a triangular shape and a semicircular shape, or said one shape or said at-least-two-combined shapes with corners rounded.

13. The head gimbal assembly as claimed in claim 10, wherein said at least one heating element is formed between said substrate and said at least one heatsink element.

14. The head gimbal assembly as claimed in claim 13, wherein said at least one heatsink element covers wholly said at least one heating element.

15. The head gimbal assembly as claimed in claim 13, wherein a heat-conduction-controlling layer is provided between said substrate and said at least one heating element, which is formed of a material with a coefficient of thermal conductivity smaller than that of materials that said substrate and said at least one heating element are formed of.

16. The head gimbal assembly as claimed in claim 10, wherein said at least one heatsink layer is formed of the same deposited film as a film that at least one layer of said lower shield layer, said upper shield layer and said at least one magnetic pole layer, is formed of.

17. The head gimbal assembly as claimed in claim 10, wherein said at least one read head element is a giant magnetoresistive effect element or a tunnel magnetoresistive effect element.

18. The head gimbal assembly as claimed in claim 10, wherein said at least one write head element is an inductive coil element for longitudinal magnetic recording or an inductive coil element for perpendicular magnetic recording.

19. A magnetic disk drive apparatus comprising:
at least one head gimbal assembly comprising:
a thin-film magnetic head comprising:
a substrate with an air bearing surface;
at least one read head element including a lower shield layer and an upper shield layer, and at least one write head element including at least one magnetic pole layer, formed on said substrate;
at least one heating element provided in a position opposite to said air bearing surface in relation to said at least one read head element and said at least one write head element; and
at least one heatsink element including at least one heatsink layer provided adjacent to an end opposite to an end in said air bearing surface side of at least one layer of said lower shield layer, said upper shield layer and said at least one magnetic pole layer,
said at least one heatsink element having a shape that a pattern width in a track-width direction of an end portion in said air bearing surface side is larger than a pattern width in the track-width direction of an end portion opposite to said end portion in said air bearing surface side; and
trace conductors for supplying currents to said at least one heating element; and
a heater-current control means for controlling currents supplied to said at least one heating element.

20. The magnetic disk drive apparatus as claimed in claim 19, wherein said at least one heatsink element has a shape that a pattern width in the track-width direction monotonically decreases from an end portion in said air bearing surface side toward an end portion opposite to said end portion in said air bearing surface side.

21. The magnetic disk drive apparatus as claimed in claim 19, wherein said at least one heatsink element has one shape or at-least-two-combined shapes of a convex shape, a shape with at least one corner of a rectangle removed, a triangular shape and a semicircular shape, or said one shape or said at-least-two-combined shapes with corners rounded.

22. The magnetic disk drive apparatus as claimed in claim 19, wherein said at least one heating element is formed between said substrate and said at least one heatsink element.

23. The magnetic disk drive apparatus as claimed in claim 22, wherein said at least one heatsink element covers wholly said at least one heating element.

24. The magnetic disk drive apparatus as claimed in claim 22, wherein a heat-conduction-controlling layer is provided between said substrate and said at least one heating element, which is formed of a material with a coefficient of thermal conductivity smaller than that of materials that said substrate and said at least one heating element are formed of.

25. The magnetic disk drive apparatus as claimed in claim 19, wherein said at least one heatsink layer is formed of the same deposited film as a film that at least one layer of said lower shield layer, said upper shield layer and said at least one magnetic pole layer, is formed of.

26. The magnetic disk drive apparatus as claimed in claim 19, wherein said at least one read head element is a giant magnetoresistive effect element or a tunnel magnetoresistive effect element.

27. The magnetic disk drive apparatus as claimed in claim 19, wherein said at least one write head element is an inductive coil element for longitudinal magnetic recording or an inductive coil clement for perpendicular magnetic recording.

* * * * *